United States Patent
Vera et al.

(10) Patent No.: US 8,386,289 B2
(45) Date of Patent: Feb. 26, 2013

(54) MULTIPLE SIMULTANEOUS SESSION SUPPORT BY A REMOTE TECHNICIAN

(75) Inventors: Roy Vera, Houston, TX (US); Michael P. Duffy, Highland Village, TX (US); Frederick T. Lamming, Denver, CO (US); Colin M. Tuggle, Minneapolis, MN (US)

(73) Assignee: Accenture Global Services Limited, Dublin (IE)

( * ) Notice: Subject to any disclaimer, the term of this patent is extended or adjusted under 35 U.S.C. 154(b) by 72 days.

(21) Appl. No.: 12/705,702

(22) Filed: Feb. 15, 2010

(65) Prior Publication Data

US 2011/0202380 A1 Aug. 18, 2011

(51) Int. Cl.
*G06Q 10/00* (2012.01)

(52) U.S. Cl. ..... 705/7.14; 709/217; 705/7.15; 705/7.16; 705/7.17; 705/7.21; 379/265.09; 379/265.12; 379/265.11; 379/210.01

(58) Field of Classification Search ........ 705/7.11–7.42; 709/201–247; 379/201.01–218.02, 220.01–332
See application file for complete search history.

(56) References Cited

U.S. PATENT DOCUMENTS

| | | | |
|---|---|---|---|
| 5,815,566 A * | 9/1998 | Ramot et al. ............. | 379/210.01 |
| 6,260,160 B1 | 7/2001 | Beyda et al. | |
| 6,408,066 B1 * | 6/2002 | Andruska et al. ........ | 379/265.12 |
| 6,550,006 B1 | 4/2003 | Khanna | |
| 6,618,162 B1 | 9/2003 | Wiklof | |
| 6,857,013 B2 | 2/2005 | Ramberg et al. | |
| 7,023,979 B1 * | 4/2006 | Wu et al. ................. | 379/265.11 |
| 7,181,512 B1 | 2/2007 | Lesher et al. | |
| 7,260,597 B1 | 8/2007 | Hofrichter et al. | |
| 7,305,465 B2 | 12/2007 | Wing et al. | |
| 7,430,290 B2 * | 9/2008 | Zhu ......................... | 379/265.01 |
| 2002/0018554 A1 * | 2/2002 | Jensen et al. ............ | 379/265.01 |

(Continued)

FOREIGN PATENT DOCUMENTS

JP 2003-196407 A 11/2003
JP 2003-330826 A 11/2003

(Continued)

OTHER PUBLICATIONS

"Realization of a Web-Based Remote Service Platform", Yin, et al., 2006-Proceedings of the 10th International Conference on Computer Supported Cooperative Work in Design.

(Continued)

*Primary Examiner* — David Rines
(74) *Attorney, Agent, or Firm* — Vedder Price PC

(57) ABSTRACT

In a remote technical support system, a technical support controller receives an indication of a maximum number of support sessions to be serviced by a remote technician. Thereafter, the technical support controller receives a service request for a user device. The technical support controller determines if handling of the service request by the remote technician would cause the number of support sessions currently being handled by the remote technician to exceed the previously-indicated maximum number of support sessions. If not, the service request is added to a work queue for the remote technician. Each service request may be classified into categories such that only remote technicians associated with a given category can handle service requests for that category. Furthermore, the process of selecting a remote technician to handle a given service request can be completely automated or based on individual remote technicians selecting service requests from a preliminary queue.

15 Claims, 6 Drawing Sheets

U.S. PATENT DOCUMENTS

| | | |
|---|---|---|
| 2002/0103582 A1 | 8/2002 | Ohmura et al. |
| 2002/0147974 A1 | 10/2002 | Wookey |
| 2003/0031992 A1 | 2/2003 | Laferriere et al. |
| 2004/0128585 A1 | 7/2004 | Hind et al. |
| 2004/0236843 A1 | 11/2004 | Wing et al. |
| 2005/0223285 A1 | 10/2005 | Faihe et al. |
| 2006/0083521 A1 | 4/2006 | Simpson et al. |
| 2006/0277096 A1 | 12/2006 | Levitus |
| 2007/0100782 A1 | 5/2007 | Reed et al. |
| 2007/0294368 A1* | 12/2007 | Bomgaars et al. ............ 709/217 |
| 2007/0299575 A1 | 12/2007 | Yamada et al. |
| 2008/0033882 A1 | 2/2008 | Kafkarkou et al. |
| 2008/0034060 A1 | 2/2008 | Fisher, Jr. |
| 2008/0091454 A1 | 4/2008 | Fisher, Jr. |
| 2008/0147789 A1 | 6/2008 | Wing et al. |
| 2008/0172574 A1 | 7/2008 | Fisher |
| 2008/0215450 A1 | 9/2008 | Gates |
| 2008/0228696 A1 | 9/2008 | Fano |
| 2008/0267178 A1 | 10/2008 | Emmerich et al. |
| 2009/0012838 A1 | 1/2009 | DeJong et al. |
| 2009/0018890 A1 | 1/2009 | Werth et al. |
| 2009/0024948 A1 | 1/2009 | Anka |
| 2009/0034411 A1 | 2/2009 | Bernard |
| 2009/0049343 A1 | 2/2009 | Katz et al. |
| 2009/0125608 A1 | 5/2009 | Werth et al. |
| 2009/0132307 A1 | 5/2009 | Messer |
| 2009/0216697 A1 | 8/2009 | Beaty et al. |
| 2010/0054453 A1* | 3/2010 | Stewart .................... 379/265.12 |
| 2010/0218012 A1 | 8/2010 | Joseph et al. |
| 2010/0246801 A1* | 9/2010 | Sundaram et al. ....... 379/265.09 |
| 2011/0087511 A1* | 4/2011 | Werth et al. .................. 705/7.14 |
| 2011/0208857 A1 | 8/2011 | Gentile et al. |

FOREIGN PATENT DOCUMENTS

| | | |
|---|---|---|
| JP | 2005-275946 A | 6/2005 |
| JP | 2008-152618 A | 3/2008 |

OTHER PUBLICATIONS

Examiner's First Report in Australian Patent Application Serial No. 2011200590 issued on May 10, 2011.

* cited by examiner

MULTIPLE SIMULTANEOUS SESSION SUPPORT BY A REMOTE TECHNICIAN

CROSS-REFERENCE TO RELATED APPLICATION

The instant application is related to co-pending application entitled "Remote Technical Support Employing A Configurable Executable Application" having U.S. patent application Ser. No. 12/705,697, filed on even date herewith.

FIELD OF THE INVENTION

The instant disclosure relates generally to the provision of remote technical support for user devices and, in particular, to the provision of such remote technical support wherein remote technicians support multiple simultaneous support sessions.

BACKGROUND OF THE INVENTION

As the use of electronic devices has increased, so has the need for technical support when such devices fail to operate as desired. As used herein, technical support includes any and all activities involved with diagnosing and potentially fixing a malfunctioning device. In some contexts (e.g., a large, commercial enterprise), such technical support is provided by a staff of on-site technicians. For example, a business having a relatively large number of computer users may employ a number of technicians particularly knowledgeable about the hardware and software systems used by the business. When problems occur with the computers of individual users, technicians may be deployed to the locations of such users to provide the necessary technical support. Typically, through historical knowledge about the level of support required to support a given number of computer users, the size of the dedicated technical support staff can be adjusted to meet predicted needs. While this approach can be effective at keeping computer users functioning most efficiently, it is relatively expensive to maintain a staff of on-site, dedicated technicians. In this era of improved connectivity (given the ubiquity of public and private computer networks), the need to service computer users, including many relatively remote users, has increased. In the event that the various computer users are spread out over a large geographic area, the provision of a dedicated staff of technicians may not be feasible.

Furthermore, not all device users are affiliated with large entities having the resources to provide dedicated technical support staff. For example, it is estimated that there are approximately 1.2 billion personal computers worldwide, including 264.1 million personal computers in the United States alone. While it is possible to engage a service in which technicians make "house calls", such service is comparatively expensive for the average home computer user. Given this, various solutions have been more recently proposed to provide remote technical support service delivered through the above-mentioned ubiquitous networks such as the Internet. For example, U.S. Patent Application Publication Nos. 2006/0277096 (in the name of Levitus), 2008/0147789 (in the name of Wing et al.), 2008/0172574 (in the name of Fisher) and 2009/0125608 (in the name of Werth et al.) describe various systems of the type generally illustrated in FIG. 1. As shown in FIG. 1, the system 100 comprises a plurality of user devices 102 that are able to communicate with a technical support controller 104 via one or more intervening networks 106, which may include public networks (such as the Internet), private networks (such as local area networks, virtual private networks, etc.) or combinations thereof. A plurality of remote technicians 108 perform the desired technical support activities for the user devices 102 as mediated by the technical support controller 104. Although the user devices 102 are often computers, other types of devices may equally benefit from such remote technical support, such as television cable set-top boxes, televisions, cellular telephones, automobiles or even more mundane devices such as kitchen appliances. The technical support controller 104 is a centralized service provided in the form, for example, of a web service that may be accessed through an appropriately configured web interface. The technical support controller 104 coordinates service requests from the user devices 102 and the deployment of the remote technicians 108 to service such requests. As illustrated, in one embodiment, the remote technicians 108a may access both the user devices 102 being serviced and the technical support controller 104 via the one or more networks 106. Alternatively, the remote technicians 108b may be directly coupled to the technical support controller 104 through proprietary connections while still servicing the user devices 102 via the network(s) 106. Because the technical support controller 104 mediates all interactions with the requesting user, the remote technician can be located virtually anywhere so long as he/she is able to communicate with the technical support controller 104. Using various remote servicing tools, the remote technicians 108 are able to interact with the user devices 102 to provide the requested technical support.

A typical model for deploying a remote technician's services is illustrated in FIG. 2. As shown therein, the remote technician is provided with a working queue 202 (usually implemented by the technical support controller) in which a number of service requests (labeled SR 1-SR N) are assigned to the remote technician. In a typical prior art system, the "depth" of a given remote technician's queue is dictated by the available service request volume and load balancing across the entire population of available remote technicians. When processing a service request, the remote technician will typically spend an initial portion of his/her time engaged with the requesting user (labeled "work"), typically gathering information about the problems being experienced by the user. Thereafter, the remote technician will typically engage in various automated/semi-automated tasks that often do not require the remote technician's complete attention. Such tasks often including remotely performing automated scans of a user device, rebooting the user device, installing software fixes on the user devices, etc. At the conclusion of these tasks, the remote technician will typically again spend time interacting directly with the requesting user to ensure that the problems have been fixed, that the customer has no further needs, etc. Thereafter, the remote technician may move to the next service request in the queue 202.

This approach of serially handling service requests, while workable, is not efficient as the remote technician often has periods of time 204a-b during which he/she is waiting on the various automated/semi-automated tasks to complete. Not only does this result in an inefficient use of the remote technician's time, this also leads to the likelihood of increased wait times for handling of the queued service requests, which in turn leads to the increased likelihood of an unsatisfactory end user experience. Thus, it would be advantageous to provide techniques that improve upon current remote technical service delivery systems.

SUMMARY OF THE INVENTION

The instant disclosure describes various approaches for improving the delivery of remote technical support. In particular, this is achieved through the use of improved automation techniques and the subsequent ability to better use and manage each remote technician's time. Thus, in one embodiment, in response to a request for service, a user device receives an executable application from the technical support controller, which executable application is subsequently invoked at the user device. Additionally, the user device receives configuration information from the technical support controller, potentially in response to a request initiated by the executable application and sent via the user device. The executable application then performs technical support processing of the user device in accordance with the configuration information. Either during or at the conclusion of the technical support processing, the executable application provides results (e.g., status and information). Furthermore, in an embodiment, the executable application can be configured based on the configuration information to engage in dynamic workflow, i.e., to make decisions about what activities to perform based on previous results. Because the configuration information can be selected according to the specific nature of the user device and/or the specific nature of the service request (i.e., the characteristics of the problem currently being experienced by the user device), the executable application can be tailored to best address the requesting customer's needs with minimal attention from a remote technician.

In another embodiment, the use of such automation is exploited to improve remote technician efficiency and, consequently, end-user experiences. In this embodiment, the technical support controller receives an indication of a maximum number of support sessions to be serviced by the remote technician. Thereafter, the technical support controller receives a service request for a user device. In attempting to have the service request processed, the technical support controller determines if handling of the service request by a given remote technician would cause the number of support sessions currently being handled by the remote technician to exceed the previously-indicated maximum number of support sessions. If not, then the service request is added to a work queue for the remote technician. Each service request may be classified into categories such that only remote technicians associated with a given category can handle service requests for that category. Such categories can be distinguished by the complexity of the problem to be solved and/or the level of skill of the remote technician. Furthermore, the process of selecting a remote technician to handle a given service request can be completely automated or based on individual remote technicians selecting service requests from a preliminary queue.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
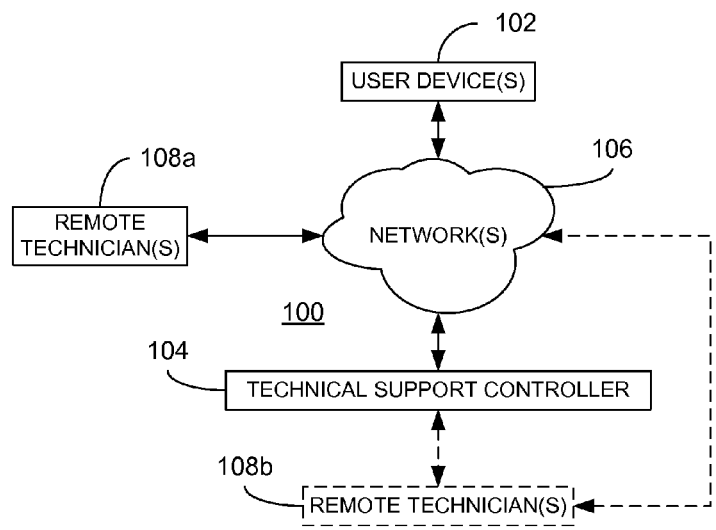
FIG. 1 is a block diagram of a system for remotely providing technical support services in accordance with the prior art.
Figure 2:
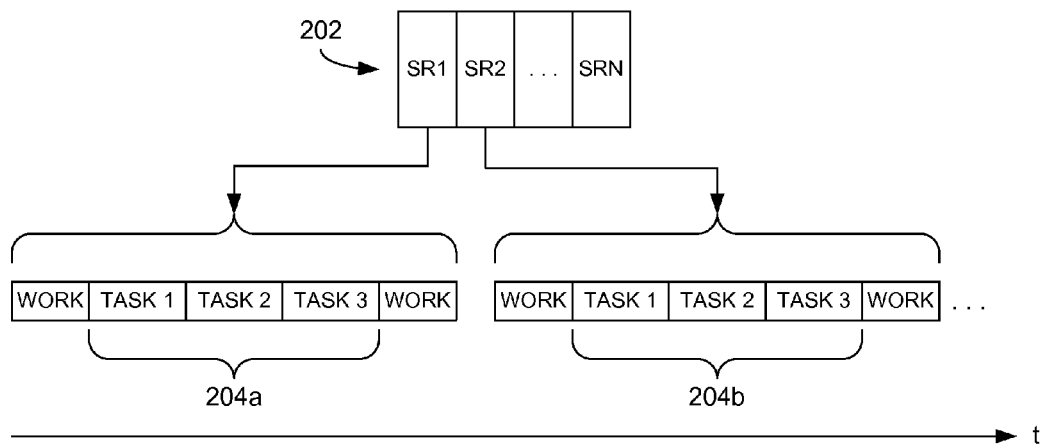
FIG. 2 is schematic illustration of the manner in which remote technicians handle service requests in accordance with the prior art.
Figure 3:
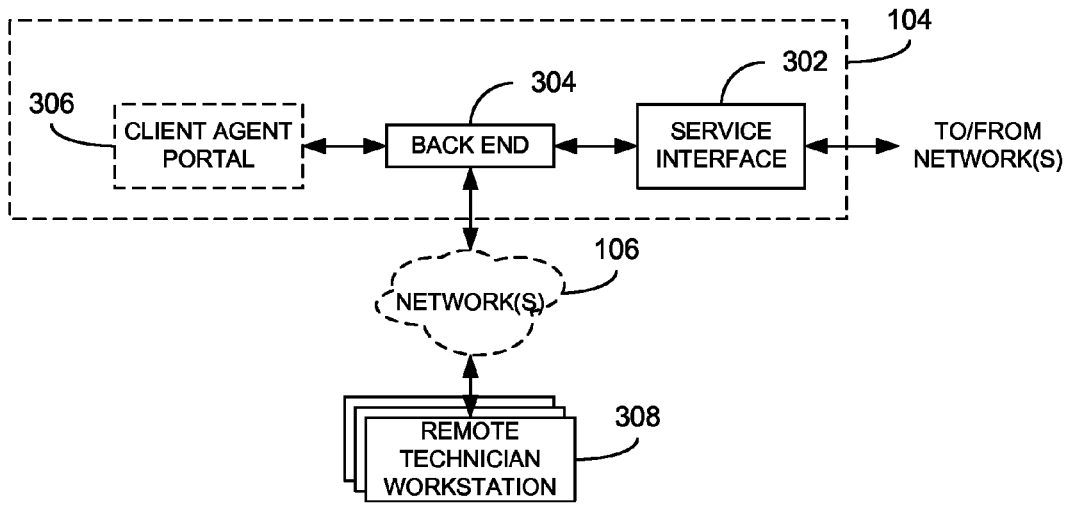
FIG. 3 is a block diagram illustrating in greater detail an embodiment of a technical support controller in accordance with the instant disclosure.

Referring now to FIG. 3, a technical support controller 104 in accordance with the instant disclosure is illustrated in greater detail. In the illustrated embodiment, the technical support controller 104 comprises a service interface 302 coupled to a back end 304. As shown, the service interface 302 couples directly to the one or more networks 106 that may be used to provide end users with access to the services provided by the technical support controller 104. To this end, the service interface 302 may comprise at least one server computer implementing one or more interactive web pages that an end user may access. For example, such web pages may be implemented using a web application framework such as ASP.NET or JavaServer Pages. The service interface 302 can be used to receive service requests from end users, which service requests may specify a user device (e.g., computer, etc. as noted above) that the end user is currently experiencing problems with as well as the nature of the problems being experienced.

Alternatively, or additionally, the service interface 302 can provide the end user with the necessary interface to allow the user to interact with a remote technician. For example, the service interface 302 may provide the end user with one or more selectable input mechanisms (e.g., one or more buttons, hyperlinks, drop down menu items, etc.) that, when selected, initiate communications between the end user (and, potentially, the user device to be serviced) and the remote technician's workstation 306.

Further still, the service interface 302 can implement those functions necessary to control and manage processing of service requests by the remote technicians. For example, the service interface 302 may provide a user device with an executable application and configuration information used to automate technical support processing as described in greater detail below. As further described in greater detail below, the service interface 302 can also implement one or more queues used to assign incoming service requests to individual ones of a plurality of remote technicians.

The back end 304, which may likewise comprise one or more database server computers, implements all of the data storage, reporting and business logic functions used to implement the remote technical support service. For example, the back end 304 may comprise one or more database servers implementing a suitable database management system (DBMS) such as Oracle Database, MySQL, etc. Using such data storage mechanisms, all data concerning pending service requests, information regarding known problems for various user devices, etc. may be stored. As further illustrated, the technical support controller 104 may also comprise a client agent portal 306 that allows an agent of an end user to access the technical support service on behalf of the end user. In this manner, the agent can provide the necessary information about the service to be performed, authorize the service and thereafter initiate the service session. In one embodiment, the client agent portal 306 may implement a web interface similar to that used by end users directly, but tailored for specific use by agents.

As further shown, the technical support controller 104 also communicates with one or more remote technician workstations 308. As noted above, communications between the technical support controller 104 and the remote technician workstation(s) 308 may be mediated by the one or more networks 106. The remote technician workstation(s) 308 may each comprise one or more computers, such as desktop or laptop computers, capable of communicating with the technical support controller 104. As described in greater detail below, each remote technician workstation 308 may be used by a corresponding remote technician to communicate information regarding the maximum number of support sessions to be handled by the remote technician.

Figure 4:
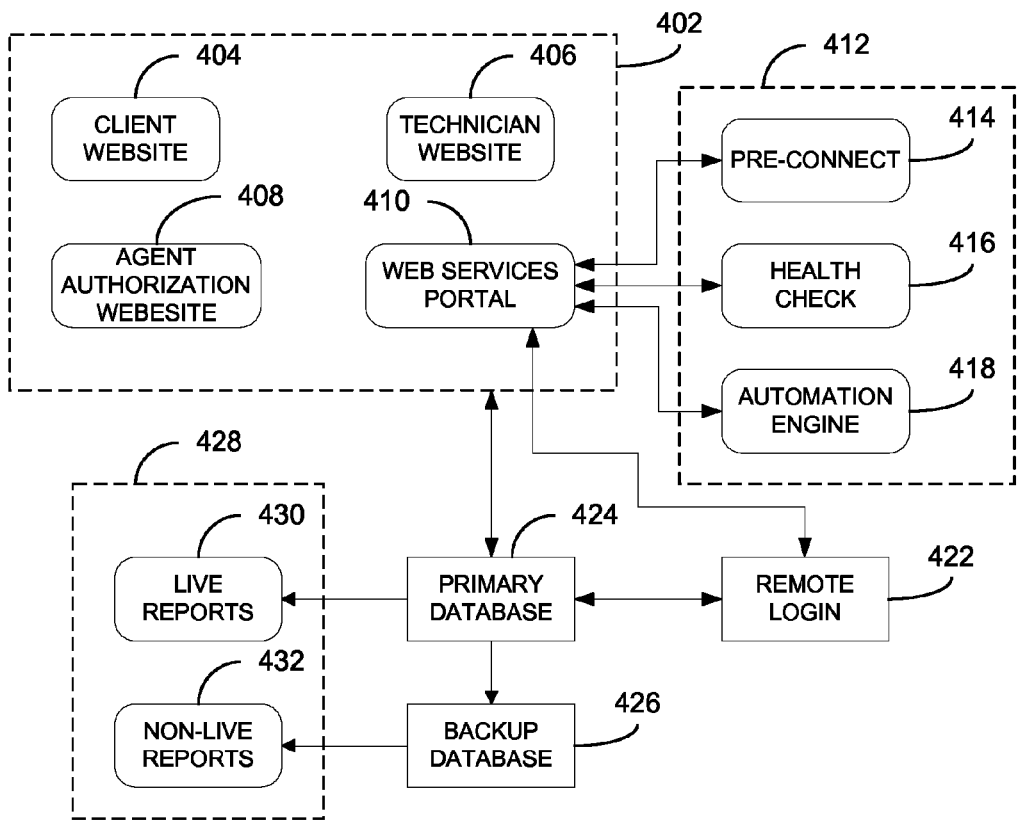
FIG. 4 is a block diagram illustrating in yet greater detail an embodiment of a technical support controller and additional services used thereby in accordance with the instant disclosure.

Referring now to FIG. 4, an embodiment of a technical support controller and additional services used thereby is illustrated in greater detail. In particular, one or more web servers 402 are provided to implement a client website 404, an agent website 406, an agent authorization website 408 and a web services portal 410. The client website 404 may comprise one or more web pages used as the interface between an end user and the technical support controller. Techniques for producing such web pages are well known in the art and need not be recited here. As noted previously, the client website 404 may be used to gather information from an end user, using various form-based interfaces, regarding the nature of the user device to be serviced as well as the problems being experienced by the end user. As noted above, it is understood that the user device to be serviced does not necessarily have to be the same as the device used by the user to access the client website 404, e.g., where the device to be serviced is a household appliance (refrigerator, cable set top box, etc.) without a typical user interface. In this scenario, it is anticipated that the device to be serviced includes a chipset that provides a remote services toolset that permits unattended access to the device. The end user can then access the client website 404 using any suitable device (e.g., home computer) and provide various information regarding the device to be serviced (e.g., a network address, installed programs, error logs, physical configuration, etc.) and authorizing access to the device to be serviced, thereby allowing a session with the device to be mediated by the capabilities of the remote services toolset.

The technician website 406 likewise implements one or more web pages to be used by the remote technicians. For example, the technician website 406 may comprise a login screen that allows each agent to securely log into the technical support controller. Upon successfully logging in, a remote technician may be presented with a graphical user interface that allows the remote technician to access various automation tools, access information about services requests either automatically assigned to the remote technician and/or view information about pending service requests available for the remote technician to select for processing. Additional services may be provided via the technician website 406 whereby a remote technician is able to obtain case management information such as historical information regarding the particulars of a previous service requests and the manner in which they were resolved, e.g., the fixes applied to the user device. The technician website 406 is also configured to maintain data regarding performance of each remote technician such as start and stop times for servicing each service request, whether the cited problem was resolved, any customer feedback on the remote technician's performance, etc. Based on such information, the technician website 406 may also perform any desired data analysis and provide reports in this vein, e.g., average length of time for the remote technician to service matters, percentage of successful resolutions, etc. In furtherance of managing his/her work load, each remote technician may also use the technician website 406 to communicate a maximum number of service requests to be handled by the remote technician at any given time, as described in further detail below. Using this information, the technician website 406 may include queue management functionality, as described below, whereby work queues for individual remote technicians are maintained.

The agent authorization website 408 may comprise one or more web pages whereby an end user may provide authorization for his/her agent to connect with the technical support controller on the end user's behalf. In an embodiment, the agent authorization website 408 provides a series of forms that permits an authorized agent to login, select a service, note relevant information from the end user, and validate that the device to be serviced is fit for service. Where the device to be serviced is accessible by the web servers 402, the agent authorization website 408 may also be used to implement applications (as described in further detail below) that gather information about the device to be serviced, e.g., gathering information about the operating system of a personal computer being serviced.

The web services portal 410 acts as an interface between the technician website 406 and various external applications 412 used by remote technicians when handling service requests. As known in the art, such a web services portal may comprise a listing of addresses (e.g., a uniform resource locator) of where to access the external applications 412. By selecting a given application via the web services portal 410, a remote technician can cause the external application to initiate a remote connection with the end user device being serviced and begin automated service thereof. As illustrated, the external applications 412 may comprise a pre-connect service 414, a health check service 416 and/or an automation engine service 418. The pre-connect service 414 is used to access the user device being serviced to validate the configuration thereof. For example, in the case of a computer, the pre-connect service 414 is used to verify the hardware and software requirements needed in order for the automated tools to work properly on the user device. Additionally, the pre-connect service 414 may be used to download, onto the user device, those tools that may be used during servicing of the user device, i.e., the software necessary to execute the various "activities" described below. For example, the downloaded tools may comprise scanning software that gathers additional information about the user device.

The health check service 416 operates to download a static (in the sense that the same processing is always performed), executable application that, upon execution on the user device, measures the performance of various operating parameters thereof. Techniques for measuring such operating parameters are well known in the art. By using the health check services 416 both at the beginning and the end of any technical support service, it may be possible to readily demonstrate the benefit obtained by the technical support service. For example, in the case of computers being serviced, the health check service 416 may be employed to measure optimization and malware related parameters such as disk fragmentation, number of viruses present, device driver versions, etc. After technical support processing, the health check service 416 may be again employed to re-measure the same parameters to illustrate the benefits incurred through the technical support processing.

The automation engine service 418 operates to download an executable application to the user device being serviced as well as configuration information used by the executable application to dynamically perform technical support processing of the user device. In an embodiment, the technical support processing performed by the executable application comprises one or more scanning activities to gather any parameters of the user device that are used during the other technical support processing operations. For example, in the context of the user device being a home computer using the "WINDOWS" operating system, a scanning operation may include invoking the Windows Management Instrumentation (WMI) interface to gather information regarding the current state of the operating system. In this case, such information may include speed of the central processing unit (CPU), free disk space, operating system (OS) type and version, network address, etc.

In an embodiment, the technical support processing further includes one or more downloading activities and application execution activities. A downloading activity is used to download other files, including executable files, to the user device. For example, it may be desirable to download anti-malware software to the user device. Finally, an application execution activity may be performed by the executable application to invoke any downloaded (or previously available) software applications available on the user device.

The configuration information used control operation of the executable application may take the form, in one embodiment, of an activity list, such as that illustrated below in Table 1.

TABLE 1

```
<ActivityList>
    <Activity Type="..."> ... </Activity>
    <Activity Type="..."> ... </Activity>
    <Activity Type="..."> ... </Activity>
    ...
    <Activity Type="..."> ... </Activity>
</ActivityList>
```

As shown in Table 1, the activity list may comprise a number of activities to be performed by the executable application, which activities may include any combination of the scanning, validation, downloading and application execution activities described above. In an embodiment, the executable application proceeds through the activity list and, as activities are completed, the executable application interacts with the automation engine service 418 to determine which additional activities in the activity list can/should be completed. To this end, the executable application can provide results of a completed activity to the automation engine service 418 that, in turn, uses the results to determine which activity to perform next. Stated another way, the automation engine service 418 tracks the results of prior activities performed by the executable application and continually determines the next course of action. In order to effect a new course of action, in one embodiment, the automation engine service 418 updates the activity list such that one or more of the next activities reflects the desired change. In an embodiment, the ability to continually determine the next course of action may result from historical knowledge of successful techniques for dealing with similar issues described by the end user. In this manner, as improved processing techniques or patterns are developed, the automation engine service 418 may be updated to reflect the improved processing. In this manner, the executable application need not be recompiled each time improved processing techniques are identified, and instead remains sufficiently flexible to accommodate such new processing techniques.

Referring once again to FIG. 4, a remote login service 422 is also provided, which service may likewise be accessed via the web services portal 410. For example, in the case of a technical support service directed to computers, the remote login service 422 may comprise the well known "LOGMEIN RESCUE" service, which service allows the remote technician to remotely login into a user device prior to performing the downloading of the executable application. As further shown in FIG. 4, a primary database 424 and a secondary database 426 (preferably in the form of one or more database servers implementing an appropriate DBMS) may be provided to store all data gathered during the handling of service requests. As shown, the primary data 424 may store all relevant data used by the various websites 404-408 and the portal 410 implemented by the web server(s) 402. Likewise, the remote login service 422 may also interact with the primary database 424 in order to store data relevant to remote login processes. As further shown, one or more reporting servers 428 may be provided in communication with the primary and backup databases 424, 426 and implementing, for example. SQL Reporting Services. In particular, any current data (in the sense of being related to technical support service requests that are currently pending) stored in the primary database 424 may be accessed by a live reporting module 430, whereas archived or backup data stored in the secondary database may be accessed via a non-live reporting module 432.

Figure 5:
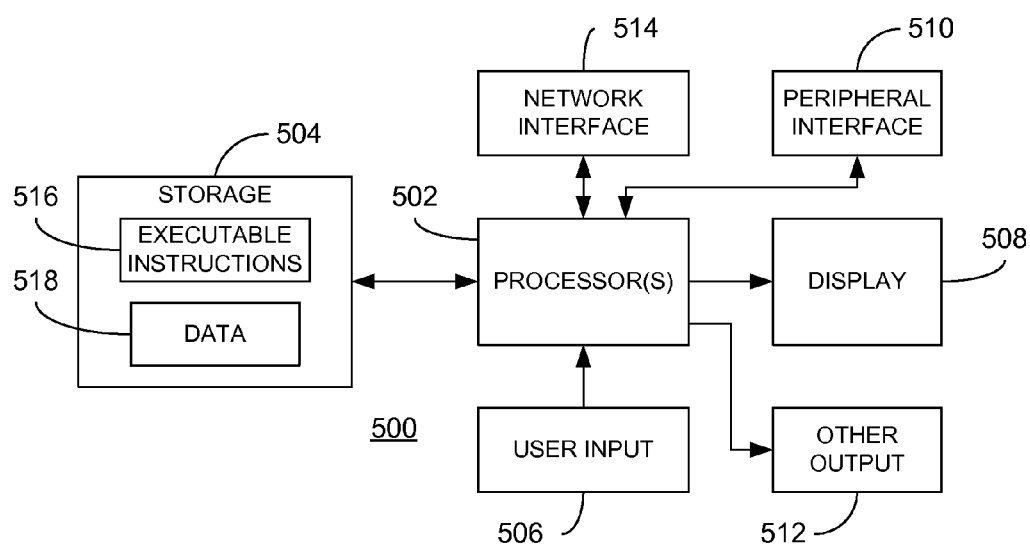
FIG. 5 is a block diagram of a processing device that may be used to implement various aspects of the instant disclosure.

FIG. 5 illustrates a representative processing device 500 that may be used to implement the teachings of the instant disclosure. In particular, the device 500 may be used to implement, in one embodiment, the various servers illustrated in FIG. 4 and, in another embodiment, the remote technician workstation(s) 308 illustrated in FIG. 3. Additionally, in an embodiment of the instant disclosure, the user devices to be serviced (e.g., computers) may also take the general form illustrated in FIG. 5. Regardless, the device 500 comprises a processor 502 coupled to a storage device 504. The storage device 504, in turn, comprises stored executable instructions 516 and data 518. In an embodiment, the processor 502 may comprise one or more processing devices such as a microprocessor, microcontroller, digital signal processor, or combinations thereof capable of executing the stored instructions 516 and operating upon the stored data 518. Likewise, the storage device 504 may comprise one or more devices such as volatile or nonvolatile memory including but not limited to random access memory (RAM) or read only memory (ROM). Processor and storage arrangements of the types illustrated in FIG. 5 are well known to those having ordinary skill in the art. In one embodiment, the various processing techniques described herein are implemented as a combination of executable instructions and data within the storage component 504.

As shown, the device 500 may comprise one or more user input devices 506, a display 508, a peripheral interface 510, other output devices 512 and a network interface 514 in communication with the processor 502. The user input device 506 may comprise any mechanism for providing user input to the processor 502. For example, the user input device 506 may comprise a keyboard, a mouse, a touch screen, microphone and suitable voice recognition application or any other means whereby a user of the device 500 may provide input data to the processor 502. The display 508, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface. Implementation of a graphical user interface in this manner is well known to those having ordinary skill in the art. The peripheral interface 510 may include the hardware, firmware and/or software necessary for communication with various peripheral devices, such as media drives (e.g., magnetic disk or optical disk drives), other processing devices or any other input source used in connection with the instant techniques. Likewise, the other output device(s) 512 may optionally comprise similar media drive mechanisms, other processing devices or other output destinations capable of providing information to a user of the device 500, such as speakers, LEDs, tactile outputs, etc. Finally, the network interface 514 may comprise hardware, firmware and/or software that allows the processor 502 to communicate with other devices via wired or wireless networks, whether local or wide area, private or public, as known in the art. For example, such networks may include the World Wide Web or Internet, or private enterprise networks, as known in the art.

While the device 500 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Further still, other implementations of the device 500 may include a greater or lesser number of components than those illustrated. Once again, those of ordinary skill in the art will appreciate the wide number of variations that may be used is this manner.

Figure 6:
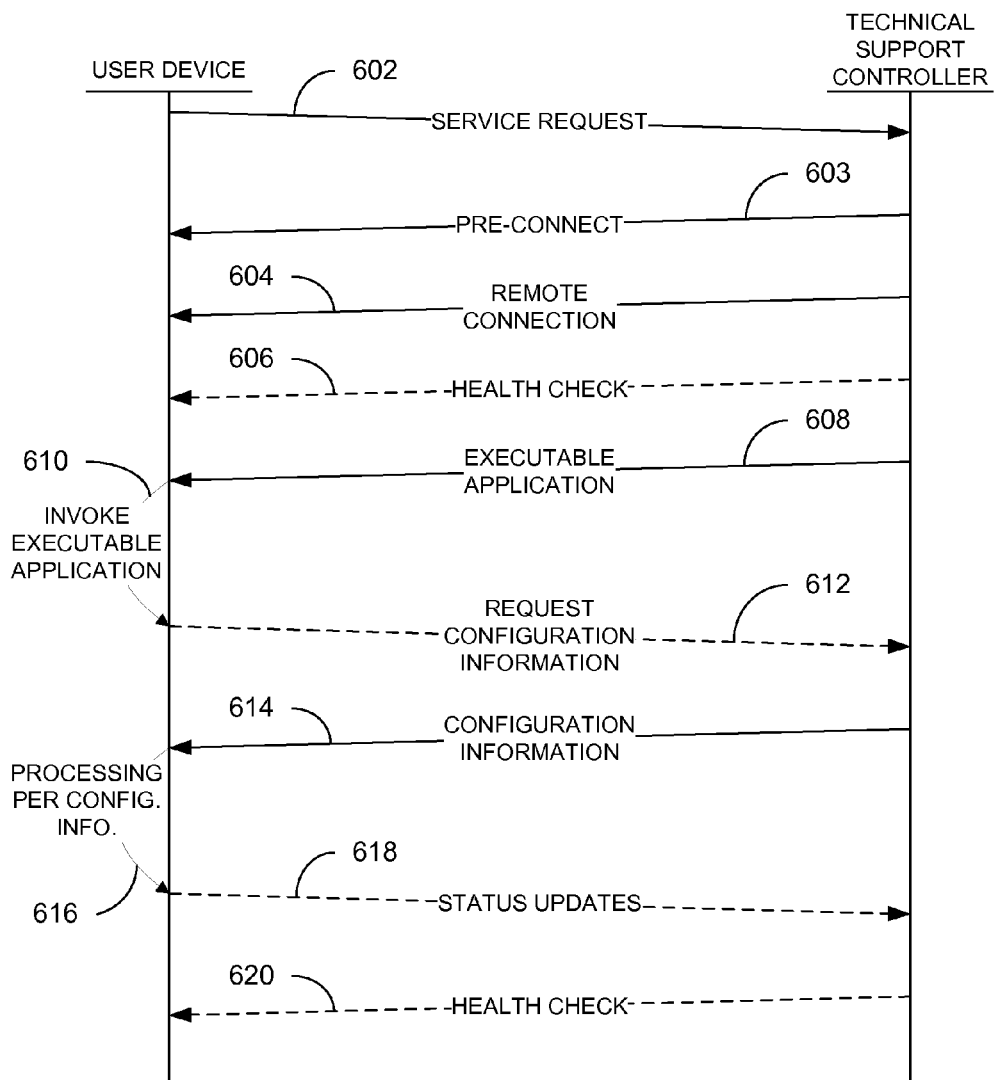
FIG. 6 is a sequence diagram illustrating interactions between a user device and a technical support controller in accordance with an embodiment of the instant disclosure.

Referring now to FIG. 6, a sequence chart is provided illustrating communication between and operations of a user device and a technical support controller in accordance with one embodiment of the instant disclosure. In one implementation, the processing illustrated in FIG. 6 is carried out through the execution of stored instructions executed by one or more processors and associated hardware as illustrated, for example, in FIG. 5. Regardless, the processing illustrated in FIG. 6 begins when a service request 602 for a user device is received, in the illustrated embodiment, by the technical support controller from the user device itself. The service request may include sufficient information to allow the technical support controller to initiate interaction with the end user, e.g., end user identification information, network address, etc. As noted above, the service request may be provided by the user device by accessing a web page provided by the technical support controller. Optionally, the service request 602 may be received from a source other than the user device to be serviced, as also described above.

Presuming that the service request 602 includes the necessary information required to initiate the technical support services, processing continues where the technical support controller invokes the pre-connect service 603 in order to validate the capabilities of the user device and to ensure compatibility of the executable application and any other tools to be downloaded to the user device. Assuming such capability/compatibility exists, the pre-connect service also downloads the various tool sets as noted above. Thereafter, the technical support controller establishes 604 a remote connection (e.g., using the "LOGMEIN RESCUE" service) between the user device and the remote technician. Once a connection has been established, the technical support controller, per instructions received from the remote technician, may optionally invoke 606 the health check service to establish a baseline of the operating parameters for the user device. The health check service may also be used in other ways. For example, it can be provided as a service that a user can invoke (via, for example, the client website 404) prior to sending in the service request 602, with the results thereof subsequently stored locally on the user's device and/or uploaded to the technical support controller. In this manner, the user is provided with the ability to better diagnose his/her device before requesting service.

Thereafter, the technical support controller also downloads 608 the executable application to the user device, which subsequently invokes 610 the executable application. Upon invocation, the executable application may optionally cause the user device to send 612 a request to the technical support controller for the necessary configuration information. In response, the technical support controller determines the necessary configuration information and returns 614 the configuration information to the user device. In an embodiment, the technical support controller, having knowledge of the problem described by the end user as well as the particular make/model of the user device, hardware configuration, etc. (as collected by the pre-connect service 606) compares this information to various instances of known value set for these same parameters. Upon finding a match (i.e., similar or identical problems, make/model of the user device, hardware configuration, etc.), the technical support controller identifies a predefined set of configuration information corresponding to that particular set of parameter values. In this manner, the configuration information can be tailored to specific circumstances in order to most effectively service the end user. In the event that a substantially specific match is not found, then a default set of configuration information (e.g., one tailored to acquire additional, potentially useful diagnostic information) can be used. Alternatively, the technical support controller may not wait to receive a request 612 from the user device, and may instead automatically send the configuration information at the same time as, or shortly after, sending the executable application.

Regardless, technical support processing, as described above, is then performed 616 by the executable application via the user device in accordance with the received configuration information. As further noted above, the various activities performed by the executable application may be made dependent upon each other such that, for example, the results of a first activity (e.g., a scan activity that determines whether anti-malware software has previously been downloaded to the user device) will determine whether a second activity (e.g., downloading the anti-malware software if not previously downloaded) or a third activity (e.g., executing the anti-malware software if previously downloaded) will be performed. In an embodiment, as each activity indicated by the configuration information is executed, results from each activity may be stored to a local log. Additional information that may be stored (either at the user device or the technical support controller) includes relevant status information, examples of which include whether the device currently has automation executing thereon, is waiting for action by the remote technician, is disconnected from the technical support controller, etc. Thereafter, upon completion of the indicated activities, the user device may optionally send 618 results/ status updates, as reflected in the local log, to the technical support controller. Alternatively, rather than waiting for complete of all of the designated activities, the user device could update the technical support controller with results/status relevant to teach activity as that activity is completed.

Finally, as further shown, upon completion of the executable application (as determined by the technical support controller upon receipt of the status updates), the technical support controller can once again invoke 620 the health check service in order to determine what improvements, if any, have resulted from the technical support processing implemented by the executable application. In an embodiment, such improvements can be presented to the end user, for example, as evidence that the problem originally indicated in the service request has been resolved.

Figure 7:
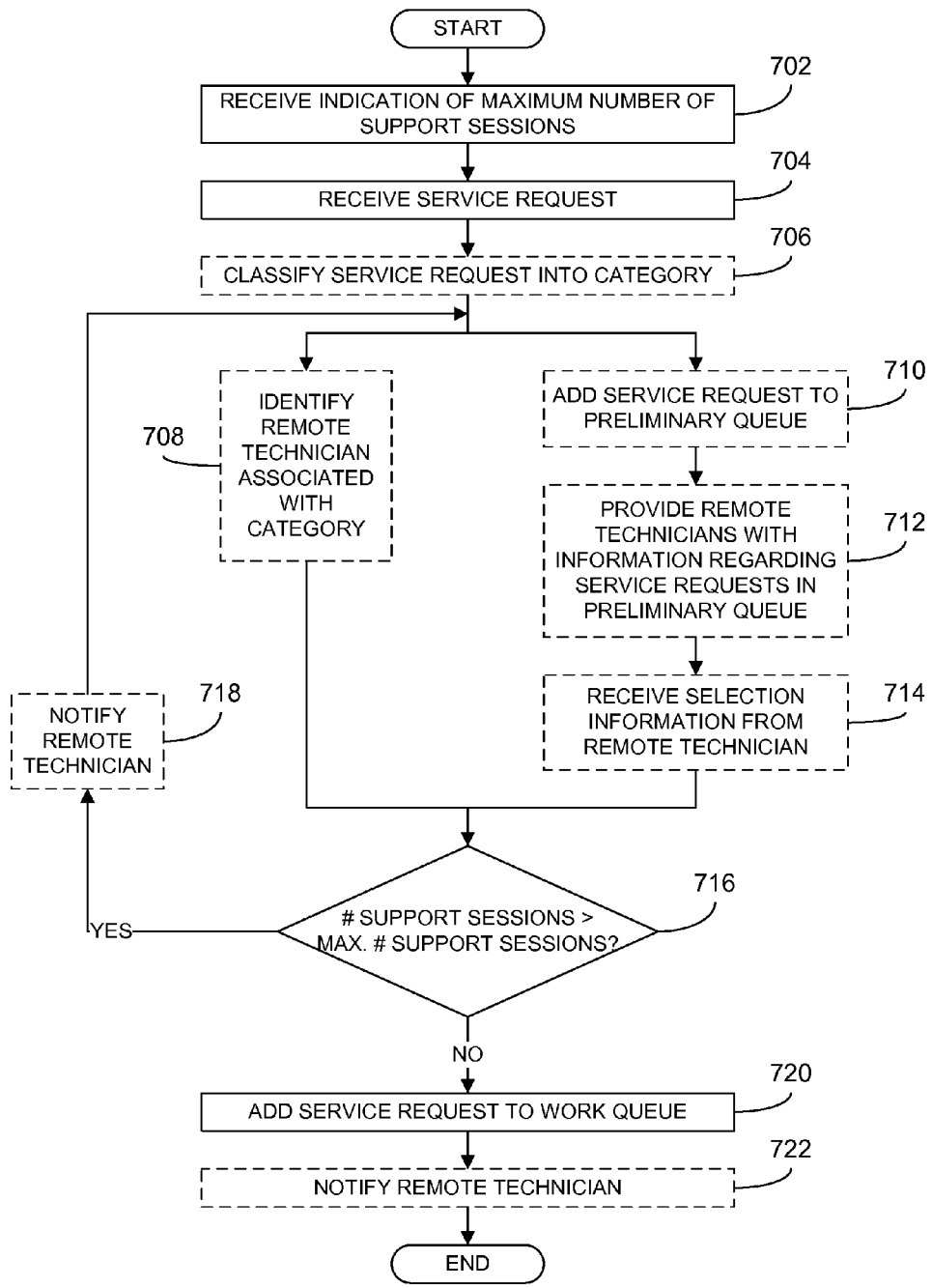
FIG. 7 is a flow chart illustrating processing according to an embodiment described herein.

FIG. 7 illustrates a flowchart of further processing in accordance with another embodiment of the instant disclosure. In particular, the processing illustrated in FIG. 7 below may be implemented by a technical support controller using stored instructions executed by one or more suitable processors, as illustrated in FIG. 5. Regardless, beginning at block 702, the technical support controller receives, from a remote technician workstation associated with a given remote technician, an indication of the maximum number of support sessions to be simultaneously serviced by the remote technician. In an embodiment, the indication of the maximum number may provided via the agent website 406 using an appropriate data input mechanism presented to the remote technician via a web page. For example, and with reference to FIG. 8, a given technician may indicate that his/her maximum number of support sessions is four (N=4), as illustrated by the work queue 802 having a maximum depth of four service requests (i.e., SR 1-SR 4).

Thereafter, at block 704, the technical support controller may receive a service request from an end user, which service request, as noted above, may include information about the user device to be serviced as well as the problem being experienced. Thereafter, as illustrated by blocks 706-714, a number of optional/alternative operations may be performed. Thus, at block 706, the technical support controller may classify the service request into one of a plurality of categories. For example, in one embodiment, the service request may be classified by the nature of the problem being experienced and/or the type/make/model/configuration of the user device to be serviced. Thus, as a further example, a desktop computer manufactured by Company A and running operating system X, experiencing excessively long startup times may be classified differently from a laptop computer manufactured by Company B and running operating system Y, but also experiencing excessively long startup times. Alternatively or additionally, the initially assessed difficulty of potentially solving the problem may be used to classify the service request. For example, a problem with slow Internet download times (potentially due, as know through experience, to the possible presence of so-called "spyware" on the user device) may be considered a relatively easier problem to address relative to a sporadically occurring system or application error (which may have a variety of complex causes). In a related vein, the categorization may take into account the level of skill needed by the remote technician to potentially fix the stated problem. Building on the previous examples, the relatively easier slow-download problem may be handled by a remote technician having only a modest amount of experience dealing with such issues, whereas the relatively harder system/application error problem may require a remote technician having specialized knowledge of the operating system or application in question.

If the service request is classified, regardless of the criteria use for such classification, processing may continue at block 708 where the technical support controller may automatically identify a remote technician that is associated with the selected category for the service request. To this end, technical support controller can maintain a database of the available categories that cross-references identifications of remote technicians that are approved to handle service requests in each category. In an alternative embodiment, each incoming service request (whether classified or not) may be added by the technical support controller to a preliminary queue at block 710. If no classification of incoming service requests is performed, the preliminary queue may be used to store all incoming services requests. Alternatively, if classification of incoming service requests is performed, the preliminary queue may be one of many preliminary queues differentiated by the various categories. As used herein, a preliminary queue stores information concerning incoming service requests that have not yet been assigned to/selected by a remote technician. Thereafter, at block 712, the technical support controller can provide information regarding the service requests in the preliminary queue to each remote technician's workstation. In an embodiment, such information may be provided to the workstations in the form of web page data to be displayed by the workstation. In one embodiment, the information may comprise an identification of the type of problem and/or the user device type/make/model/configuration, as well as an indication of how long the service request has been pending. In order to ensure that incoming service requests are not allowed to reside in the preliminary queue too long, the information provided to the remote technicians may be limited to only the top X oldest (in terms of pendency) service requests in the preliminary queue.

Based on the information provided at block 712, processing continues at block 714 where the technical support controller may receive selection information from a remote technician in response. The selection information may comprise, for example, an indication that the remote technician has selected a specific service request from the various service requests indicated in the information provided. In this manner, the remote technicians are allowed to select which particular service requests they will handle. Note that both the automatic approach (block 708) and the technician-selection approach (blocks 710-714) may be used in combination as well.

Regardless of the manner in which a given service request is associated with a remote technician, processing may continue at block 716 where the technical support controller determines whether handling of the service request would cause a number of support sessions currently being handled by the remote technician to exceed the previously-supplied indication of the maximum number of support sessions to be simultaneously supported by the remote technician. Once again, the indication of the maximum number of support sessions to be simultaneously supported by the remote technician can be stored in a database cross-referenced according identification information of the remote technician. If the number of current sessions would exceed the maximum, processing may continue at block 718 where an indication of this result is provided to the previously assigned/selecting remote technician. Thereafter, processing may continue at either blocks 708 or 710 in an attempt to identify another remote technician to handle the service request.

If, however, it is determined that the remote technician could handle the service request without exceeding the maximum number, processing continues at block 720 where the service request is added by the technical support controller to a work queue associated with that remote technician. Where a preliminary queue is used, the service request is removed from the preliminary queue to ensure that it is not assigned to/selected by another remote technician. Furthermore, at block 722, the remote technician may be notified that the service request has been added to his/her work queue and is now available for further processing.

Figure 8:
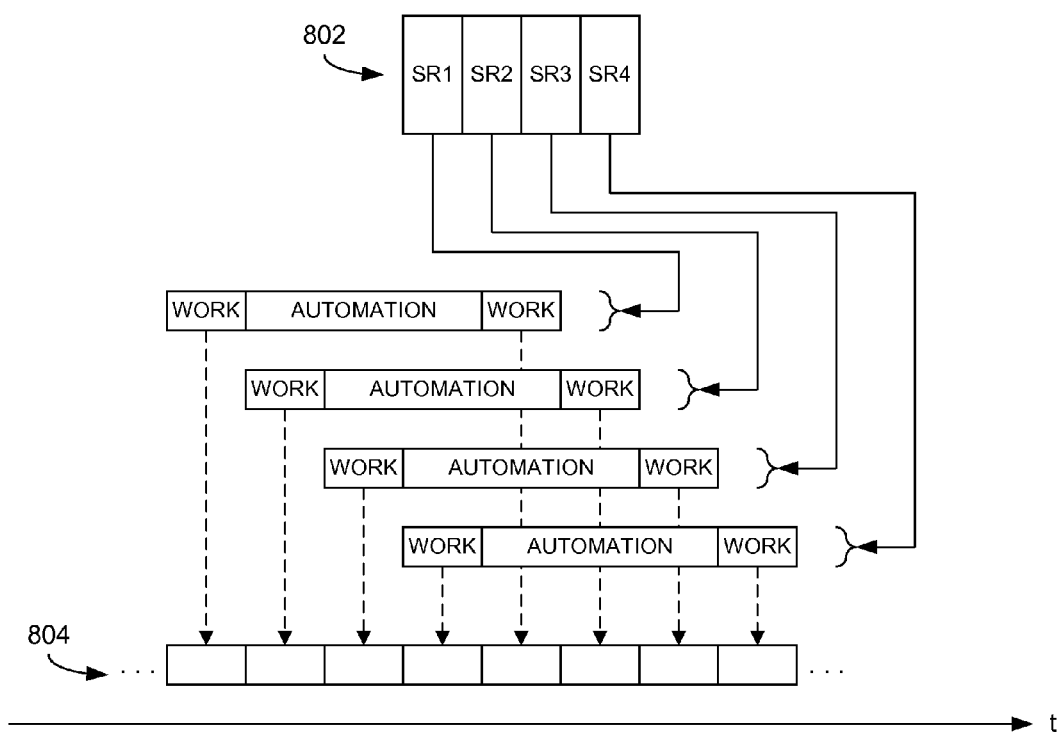
FIG. 8 is a schematic illustration of the manner in which remote technicians handle service requests in accordance with the instant disclosure.

As noted previously, a benefit of the automation and work queue management described above is that each remote technician's time may be more efficiently used, as further illustrated in FIG. 8. As shown, given the dynamic automation described above, each technician may initiate work on a given service request and, while the automation for that service request is operating, initiate work and automation on one or more other services requests. In the idealized example illustrated in FIG. 8, the resulting utilization 804 of the remote technician's time can be increased to the extent that multiple simultaneous support sessions (four, in the illustrated example) may be handled by the remote technician. If experience for a given remote technician indicates that he/she is trying to handle too many sessions simultaneously (as indicated, for example, by an excessively long average resolution time), a suggestion may be provided to the remote technician to decrease his/her maximum simultaneous session number.

As described above, the instant disclosure describes techniques that improve upon the current state of the art with regard to remote technical support services. This is achieved through the use of downloaded executable applications that are configured according to configuration information that is also downloaded to the user device being serviced. Because the configuration information can be tailored to specific needs, the automation thus employed may be made more efficient and require less user intervention. Furthermore, by allowing remote technicians to designate the number of simultaneous sessions they can support, the improved efficiencies offered by the dynamic automation may be exploited to likewise make more efficient use of each remote technician's time. For at least these reasons, the above-described techniques represent an advancement over prior art teachings.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for providing technical support service for a plurality of user devices, the method comprising:
    receiving, by a technical support controller from a remote technician, input indicating a maximum number of support sessions to be simultaneously serviced by the remote technician;
    receiving, by the technical support controller, a service request for an end user device of the plurality of end user devices;
    determining, by the technical support controller, whether processing of the service request by the remote technician would cause a number of support sessions currently serviced by the remote technician to exceed the maximum number of support sessions; and
    when processing of the service request by the remote technician would not cause the number of support sessions currently serviced by the remote technician to exceed the maximum number of support sessions, adding, by the technical support controller, the service request to a work queue associated with the remote technician.

2. The method of claim 1, further comprising:
    classifying, by the technical support controller, the service request into a category of a plurality of work categories; and
    determining, by the technical support controller, that the remote technician is associated with the category.

3. The method of claim 2, wherein each of the plurality of categories corresponds to a separate skill level of remote technicians.

4. The method of claim 1, further comprising:
    sending, by the technical support controller to the remote technician, an indication that the service request has been added to the work queue.

5. The method of claim 1, further comprising:
    adding, by the technical support controller, the service request to a preliminary queue;
    providing, by the technical support controller to the remote technician, information regarding service requests in the preliminary queue; and
    receiving, by the technical support controller from the remote technician responsive to the information regarding the service requests in the preliminary queue, selection information corresponding to the service request,
    wherein adding the service request to the work queue further comprises removing the service request from the preliminary queue and adding the service request to the work queue responsive to the selection information.

6. An apparatus for providing technical support service for a plurality of user devices, comprising:
    a processor; and
    a storage device, operatively connected to the processor, having stored thereon instructions that, when executed by the processor, cause the processor to:
    receive, from a remote technician, input indicating a maximum number of support sessions to be simultaneously serviced by the remote technician;
    receive a service request for an end user device of the plurality of end user devices;
    determine whether processing of the service request by the remote technician would cause a number of support sessions currently serviced by the remote technician to exceed the maximum number of support sessions; and
    when processing of the service request by the remote technician would not cause the number of support sessions currently serviced by the remote technician to exceed the maximum number of support sessions, add the service request to a work queue associated with the remote technician.

7. The apparatus of claim 6, wherein the storage device further comprises instructions that, when executed by the processor, cause the processor to:
    classify the service request into a category of a plurality of work categories; and
    determine that the remote technician is associated with the category.

8. The apparatus of claim 7, wherein each of the plurality of categories corresponds to a separate skill level of remote technicians.

9. The apparatus of claim 6, wherein the storage device further comprises instructions that, when executed by the processor, cause the processor to:
    send, to the remote technician, an indication that the service request has been added to the work queue.

10. The apparatus of claim 6, wherein the storage device further comprises instructions that, when executed by the processor, cause the processor to:

add the service request to a preliminary queue;

provide, to the remote technician, information regarding service requests in the preliminary queue; and receive, from the remote technician responsive to the information regarding the service requests in the preliminary queue, selection information corresponding to the service request, wherein those instructions that, when executed, cause the processor to add the service request to the work queue are further operative to remove the service request from the preliminary queue and add the service request to the work queue responsive to the selection information.

11. A system for providing technical support service for a plurality of user devices, the system comprising:

a remote technician workstation operable to receive, from a remote technician, input indicating a maximum number of support sessions to be simultaneously serviced by the remote technician; and a technical support controller, operatively connected to the remote technician workstation, operable to receive the input indicating the maximum number of support sessions from the remote technician workstation and to receive a service request for an end user device of the plurality of end user devices, the technical support controller further operable to determine whether processing of the service request by the remote technician would cause a number of support sessions currently supported by the remote technician to exceed the maximum number of support sessions and, when processing of the service request by the remote technician would not cause the number of support sessions currently supported by the remote technician to exceed the maximum number of support sessions, to add the service request to a work queue associated with the remote technician.

12. The system of claim 11, wherein the technical support controller is further operable to classify the service request into a category of a plurality of work categories and determine that the remote technician is associated with the category.

13. The system of claim 12, wherein each of the plurality of categories corresponds to a separate skill level of remote technicians.

14. The system of claim 11, wherein the technical support controller is further operative to send, to the remote technician workstation, an indication that the service request has been added to the work queue.

15. The system of claim 11, wherein the technical support controller is further operative to add the service request to a preliminary queue, to provide, to the remote technician workstation, information regarding service requests in the preliminary queue, to receive, from the remote technician workstation responsive to the information regarding the service requests in the preliminary queue, selection information corresponding to the service request and, responsive to the selection information, to remove the service request from the preliminary queue and add the service request to the work queue.

* * * * *